United States Patent [19]

Aldereguia et al.

[11] Patent Number: 5,761,533
[45] Date of Patent: Jun. 2, 1998

[54] COMPUTER SYSTEM WITH VARIED DATA TRANSFER SPEEDS BETWEEN SYSTEM COMPONENTS AND MEMORY

[75] Inventors: Alfredo Aldereguia; Nader Amini; Daryl Carvis Cromer, all of Boca Raton; Richard Louis Horne, Boynton Beach, all of Fla.; Ashu Kohli, Williston, Vt.; Kimberly Kibbe Sendlein; Cang Ngoc Tran, both of Boca Raton, Fla.

[73] Assignee: International Business Machines Corporation, Armonk, N.Y.

[21] Appl. No.: 293,411

[22] Filed: Aug. 19, 1994

Related U.S. Application Data

[63] Continuation of Ser. No. 816,693, Jan. 2, 1992, abandoned.

[51] Int. Cl.$^6$ ........................................................ H01J 1/00
[52] U.S. Cl. ................................................ 395/845; 395/280
[58] Field of Search ............................ 395/457, 458, 395/474, 475, 250, 280, 476, 477, 842, 845

[56] References Cited

U.S. PATENT DOCUMENTS

| | | | |
|---|---|---|---|
| 4,219,883 | 8/1980 | Kobayashi et al. | 365/189 |
| 4,245,307 | 1/1981 | Kapeghian et al. | 395/287 |
| 4,499,536 | 2/1985 | Gemma et al. | 395/425 |
| 4,542,454 | 9/1985 | Brcich et al. | 395/425 |
| 4,561,024 | 12/1985 | Tamura | 358/287 |
| 4,807,121 | 2/1989 | Halford | 395/873 |
| 4,851,990 | 7/1989 | Johnson et al. | 395/325 |
| 4,860,111 | 8/1989 | Shimizu et al. | 358/400 |
| 4,878,166 | 10/1989 | Johnson et al. | 395/425 |
| 4,954,951 | 9/1990 | Hyatt | 395/425 |
| 5,097,437 | 3/1992 | Larson | 395/775 |
| 5,142,672 | 8/1992 | Johnson et al. | 395/500 |
| 5,175,864 | 12/1992 | Tairaku et al. | 395/800 |
| 5,179,667 | 1/1993 | Iyer | 395/275 |
| 5,193,193 | 3/1993 | Iyer | 395/725 |
| 5,280,486 | 1/1994 | Arkin et al. | 371/29.1 |
| 5,301,343 | 4/1994 | Alvarez | 395/425 |
| 5,313,587 | 5/1994 | Patel et al. | 395/840 |
| 5,329,471 | 7/1994 | Swoboda et al. | 364/578 |

*Primary Examiner*—David L. Robertson
*Attorney, Agent, or Firm*—Calfee, Halter & Griswold

[57] ABSTRACT

A computer system is provided, comprising system memory and a memory controller which resides on a system bus for controlling access to the system memory, a bus interface unit and a direct memory access controller also residing on the system bus, and a central processing unit electrically connected with the memory controller which is able to read and write data to the system memory via the memory controller. The memory controller and the bus interface unit each operate, when either is in control of the system bus, at a clock frequency which is a multiple of the clock frequency at which the direct memory access controller operates on the system bus. The memory controller and the bus interface unit each operate, when the direct memory access controller is in control of the system bus, at the same clock frequency as that of the direct memory access controller. The clock frequencies of the memory controller, the bus interface unit and the direct memory access controller are each synchronized in time. The computer system thereby permits system bus devices, operating at different clock frequencies, to coexist on the system bus without hindering the performance of the faster speed devices.

7 Claims, 5 Drawing Sheets

COMPUTER SYSTEM WITH VARIED DATA TRANSFER SPEEDS BETWEEN SYSTEM COMPONENTS AND MEMORY

This is a continuation of application Ser. No. 07/816,693 filed on Jan. 2, 1992 now abandoned.

RELATED APPLICATIONS

The following United States patent applications are incorporated herein by reference as if they had been fully set out:

application Ser. No. 816,116 Filed Jan. 02, 1992 Entitled "ARBITRATION MECHANISM" (Further identified as Attorney Docket BC9-91-090)

application Ser. No. 816,184 Filed Jan. 2, 1992 Entitled "PARITY ERROR DETECTION AND RECOVERY" (Further identified as Attorney Docket BC9-91-091)

application Ser. No. 816,204 Filed Jan 2, 1992 Entitled "CACHE SNOOPING AND DATA INVALIDATION TECHNIQUE" (Further identified as Attorney Docket BC9-91-092)

application Ser. No. 816,203 Filed Jan. 2, 1992 Entitled "BUS INTERFACE LOGIC FOR COMPUTER SYSTEM HAVING DUAL BUS ARCHITECTURE" (Further identified as Attorney Docket BC9-91-093)

application Ser. No. 816,691 Filed Jan. 2, 1992 Entitled "BIDIRECTIONAL DATA STORAGE FACILITY FOR BUS INTERFACE UNIT" (Further identified as Attorney Docket BC9-91-105)

application Ser. No. 816,698 Filed Jan. 2, 1992 Entitled "METHOD AND APPARATUS FOR DETERMINING ADDRESS LOCATION AT BUS TO BUS INTERFACE" (Further identified as Attorney Docket BC9-91-107)

BACKGROUND OF THE INVENTION

The present invention relates to bus to bus interfaces in computer systems, and more particularly to a bus to bus interface for synchronizing operation of buses in the system to compensate for devices which communicate to each other at different rates and over different data transfer bandwidths.

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

System bus devices communicate over the system bus at various speeds. For example, the CPU may operate at a higher speed that the DMA controller due to the silicon technologies and level of complexity involved in their respective manufacturing processes. Performance of a synchronous system bus suffers when the operating frequency is limited to the slowest device on the bus when higher frequency controllers are present. In such a case, the higher speed system bus device, such as the CPU, must operate at the slower device speed in order to effectively communicate over the system bus.

It is an object of the present invention, then, to provide a bus interface unit for a dual bus architecture computer system which permits system bus devices, operating at different speeds, to coexist on the system bus without hindering the performance of the faster speed devices.

SUMMARY OF THE INVENTION

The present invention provides a mechanism for allowing synchronous operation of a plurality of devices residing on a system bus in a computer system. Each of the devices operates at a frequency which is a multiple of the lowest of the frequencies at which the devices operate. By defining system bus frequencies to be multiples of the lowest frequency, and by maintaining system bus clocks which correspond to these system bus frequencies, the slower devices operating at a fraction of the speed of the faster devices may coexist on the system bus without degrading the performance of the faster system bus devices.

The speeds at which devices residing on the system bus operate are dependent on the complexity of the devices and the technology used to implement the devices. In data processing computer systems, a plurality of devices residing on a system bus may operate at different frequencies. In such systems synchronous operation is desired because it optimizes system performance by eliminating the need to independently synchronize bus handshaking signals.

The system bus devices in the computer system of the present invention includes a slower device which operates at half the speed of faster devices on the system bus. Programmability of the slower speed devices is accomplished by assigning the I/O addresses of these devices within a range of addresses which will be ran at the slowest frequency on the bus. Outside this address range each of the devices residing on the system drives a control line on the system bus when it is in control of the system bus to indicate whether it is a slower speed controlling device or a full speed controlling device. When the slower device is in control of the system bus, it drives the control line to indicate that a slower speed device controls the bus, and the remaining system devices interface with the slower device at the slower speed. When, however, a full speed device indicates that it is in control of the system bus via the control line, it is permitted to communicate at full speed with other full speed devices over the system bus. Accordingly, the half speed device may coexist on the system bus with the faster system bus devices without compromising the performance of the faster devices.

BRIEF DESCRIPTION OF THE PREFERRED EMBODIMENT

Figure 1:
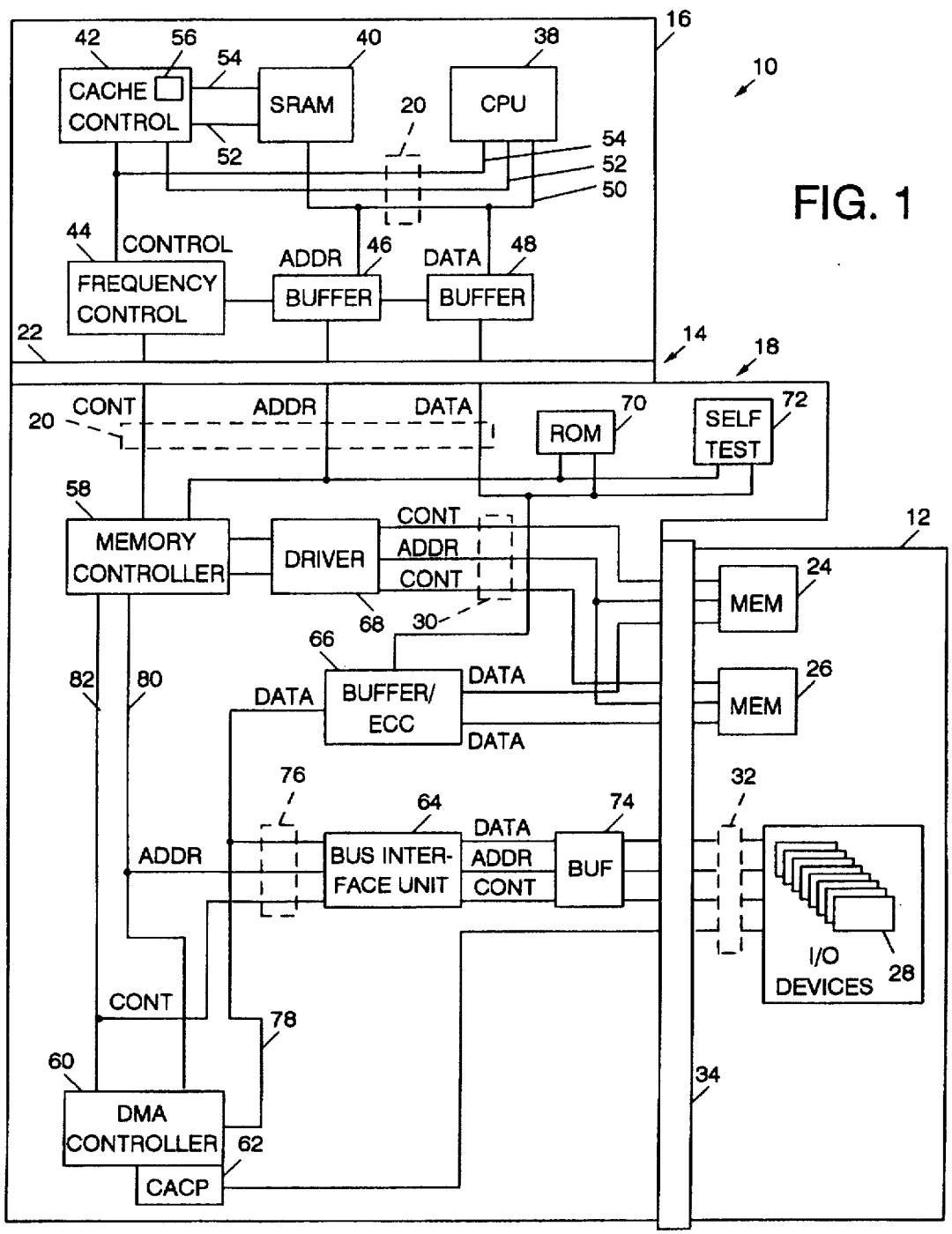
FIG. 1 is a schematic block diagram of a computer system incorporating a bus interface unit constructed according to the principles of the present invention.

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL® computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46. Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28. DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figure 2:
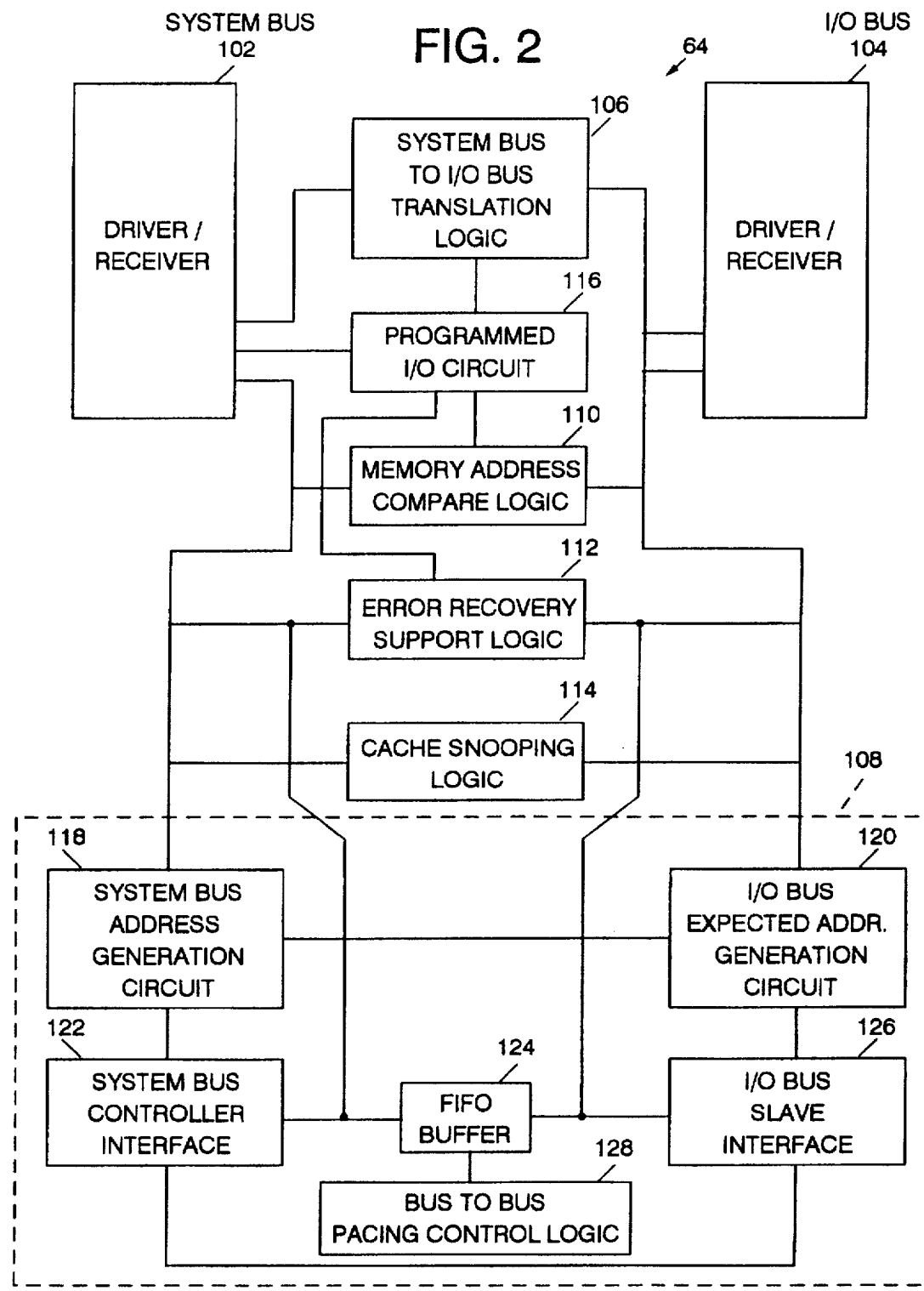
FIG. 2 is a schematic block diagram of the bus interface unit of the computer system of FIG. 1.

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 2) acts as a slave to the bus interface unit 64, and either provides the interface 64 with data read from system memory or writes data to system memory. The reads and writes to system memory are accomplished through the FIFO buffer 124, a block diagram of which is illustrated in FIG. 3.

Figure 3:
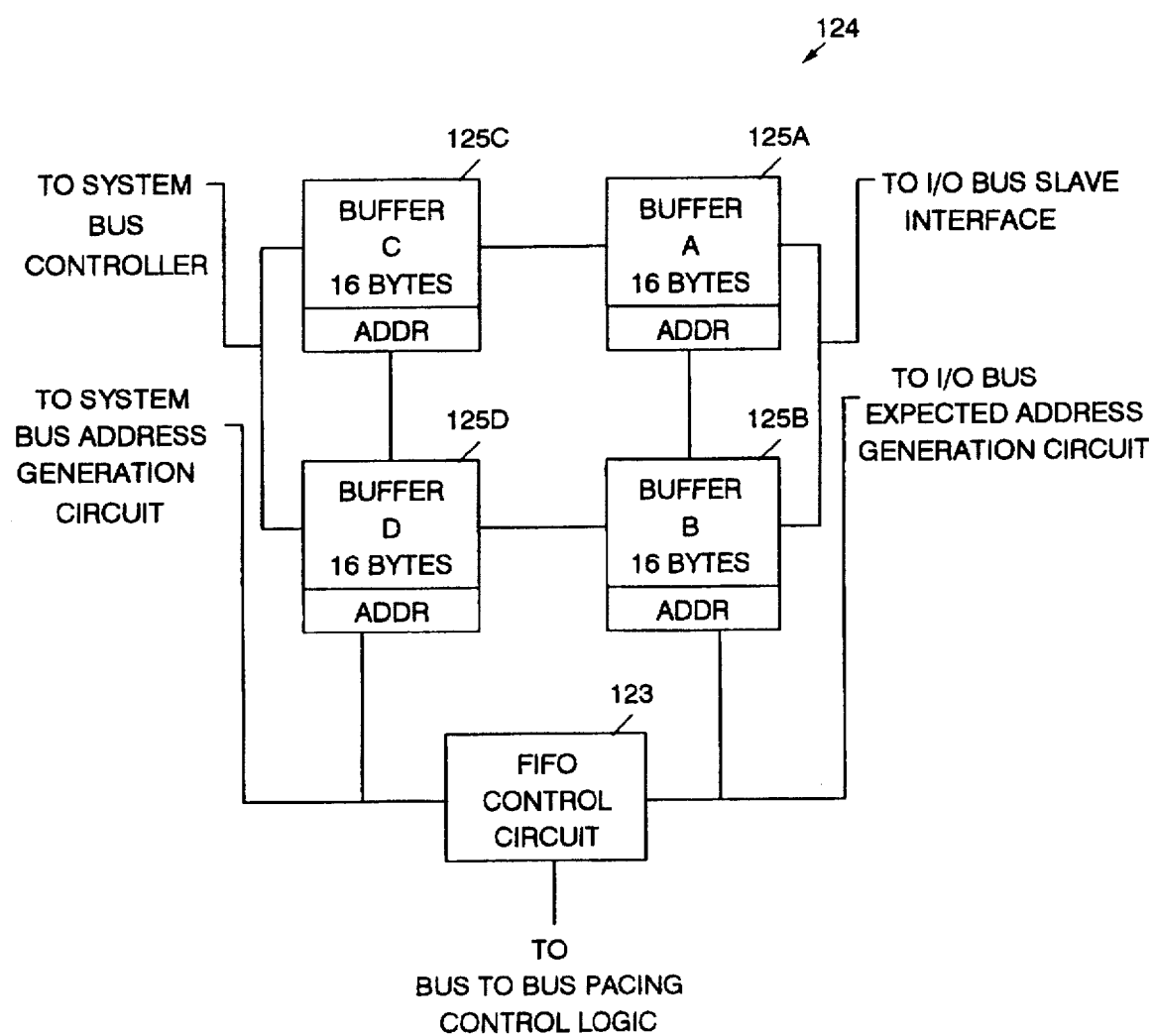
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A–125D and FIFO control circuit 123. The four buffers 125A–125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are coupled to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a positive compare indicates that the write occurred in cacheable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

The present invention relates generally to the system bus 76 in the system 10 described above, and more particularly to a mechanism for varying the speed of data transfer over the system bus. The mechanism of the present invention thereby permits system bus devices, operating at different speeds, to coexist on the system bus without hindering the performance of the faster speed devices.

Programmability of the slower speed devices is accomplished by assigning the I/O addresses of these devices within a range of addresses which will be run at the slowest frequency on the bus. Outside this address range the speed of data transfer over the system bus 76 is determined by the operating clock frequency of the particular system device in control of the system bus. In the computer system 10, the system bus devices referred collectively to the memory controller 58 (which operates on behalf of the CPU 38 when controlling the system bus 76), the bus interface unit 64 (which operates on behalf of an I/O device 28 when controlling the system bus 76), and the DMA controller 60. Each of the system devices operates at a clock frequency which is generated by a system clock generation circuit (not shown in FIG. 1).

In the system 10, the DMA controller 60 operates at a clock frequency of twenty MHz. The bus interface unit 64 and the memory controller 58 operate at clock frequencies of forty MHz. Both the twenty MHz clock frequency and the forty MHz clock frequency are provided in a synchronized relationship by the system clock generation circuit. Hence, the DMA controller 60 operates at a clock frequency which is one half the clock frequency at which the memory controller 58 and the bus interface unit 64 operate. The present invention, however, is not limited to applications wherein one of the system devices operates at one half of the clock frequency of the other system devices. The present invention has applications in any system wherein faster speed system devices operate on a system bus at clock frequencies which are even multiples of synchronized clock frequencies at which slower speed devices operate on the system bus.

Figure 4:
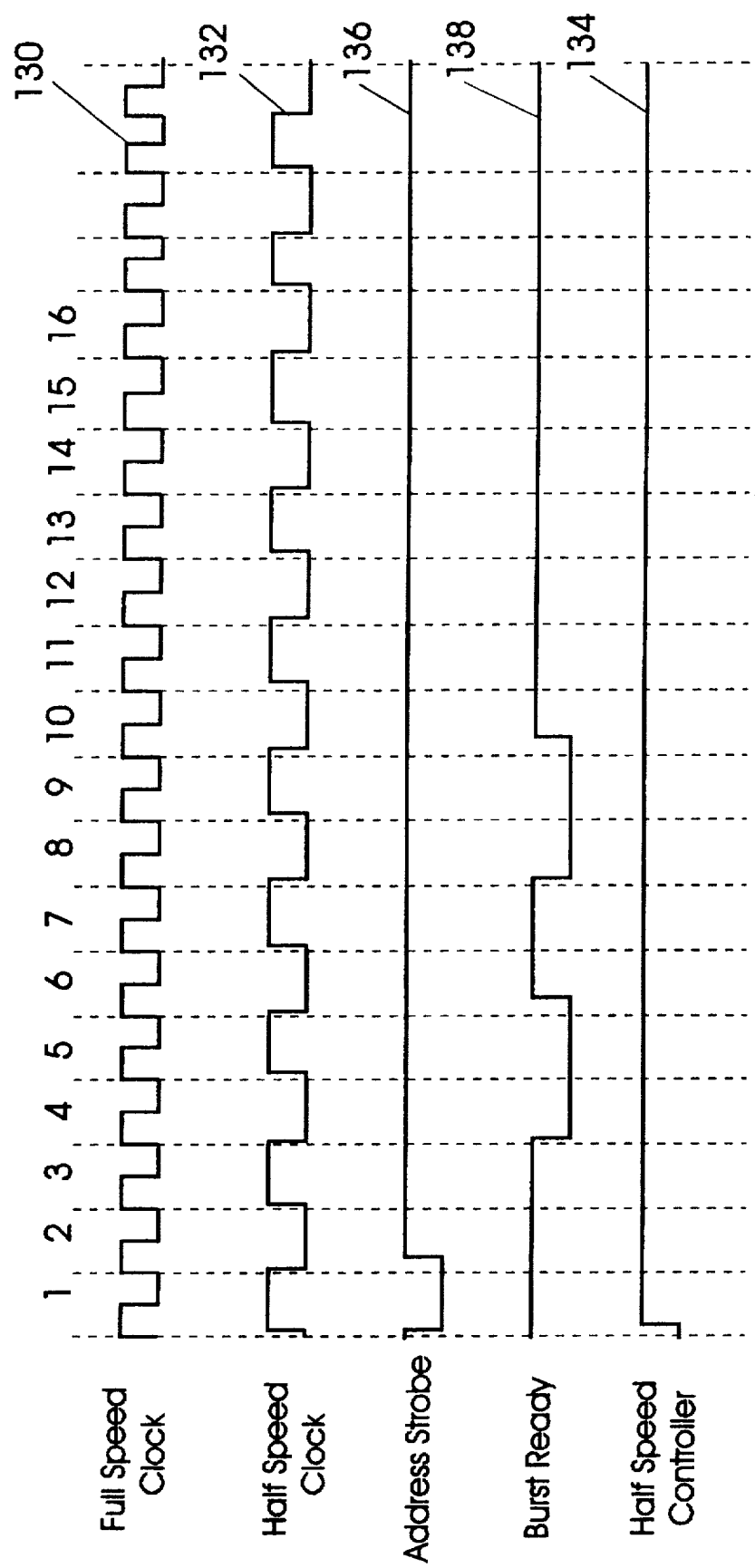
FIG. 4 is a timing diagram illustrating the operation of the system bus of FIG. 1 at full speed.
Figure 5:
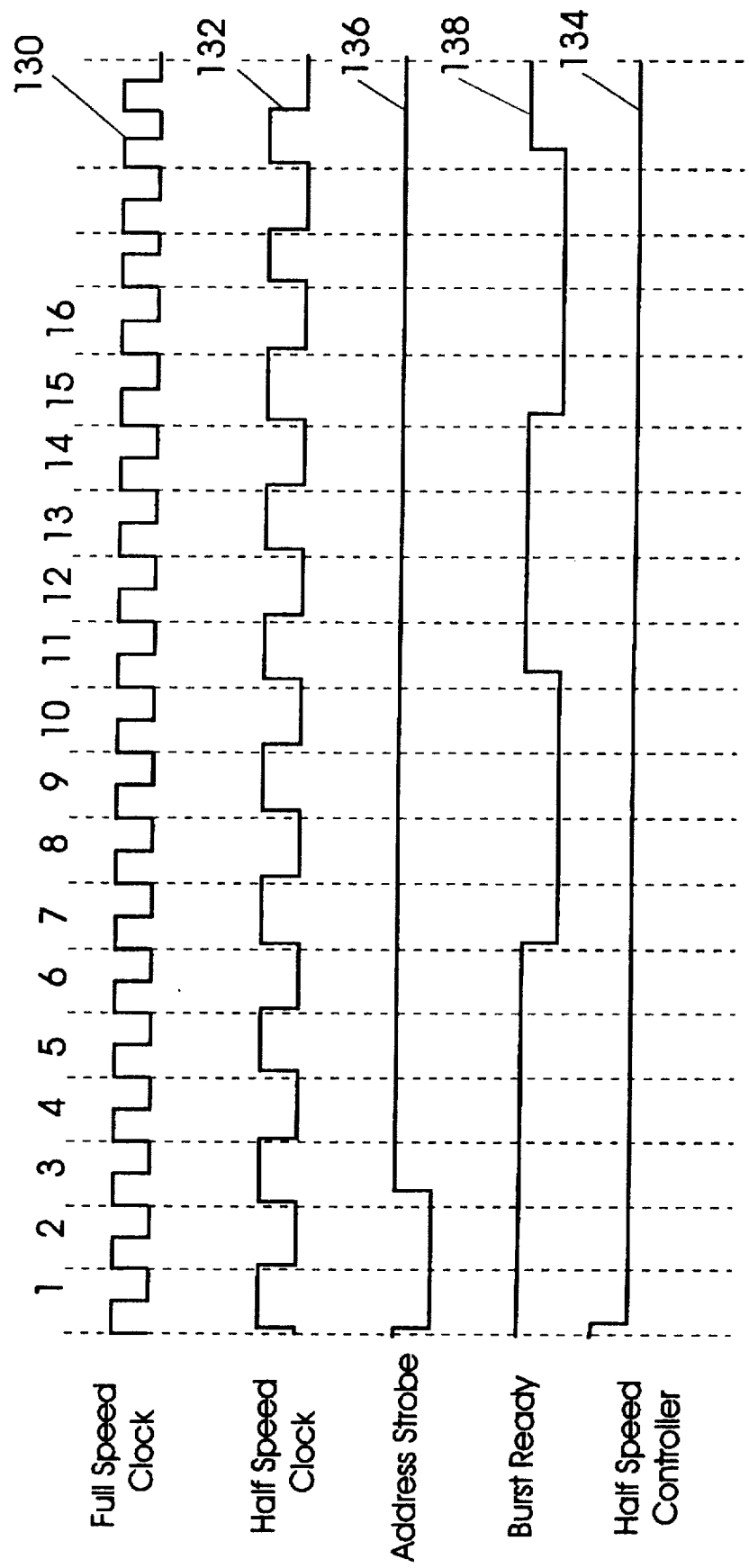
FIG. 5 is a timing diagram illustrating the operation of the system bus of FIG. 1 at half speed.

FIGS. 4 and 5 are timing diagrams illustrating the full and half speed operation, respectively, of the system bus 76 of the present invention. The first line of FIGS. 4 and 5 represents the full speed clock frequency 130 (forty MHz) at which the memory controller 58 and the bus interface unit 64 operate when controlling the system bus 76. The second line of FIGS. 4 and 5 represents the half speed clock frequency 132 (twenty MHz) at which the memory controller 58 and the bus interface unit 64 operate when the DMA controller 60 controls the system bus 76. As described above, both of these clock frequencies are provided by the system clock generation circuit.

The last line of FIGS. 4 and 5 represents the half speed controller signal 134. The half speed controller signal 134 is a negative active signal on the control information path 82 of the system bus 76 which indicates to the system devices whether a full speed (forty MHz) or a half speed (twenty MHz) system device is presently controlling the system bus 76. Hence, if the DMA controller 60 is in control of the system bus 76, the DMA controller will drive half speed controller signal 134 low (active) to indicate to the memory controller 58 and the bus interface unit 64 that a half speed device is in control of the system bus. The memory controller 58 and the bus interface unit 64 will respond accordingly by operating at the half speed clock frequency 132. Similarly, if either the memory controller 58 or the bus interface unit 64 is in control of the system bus 76, either of these system devices will drive half speed controller signal 134 high (inactive) to indicate to the other system devices that a full speed device is in control of the system bus. The other system devices will respond accordingly by operating at the full speed clock frequency 130.

The third line of FIGS. 4 and 5 represents an address strobe signal 136. The address strobe signal 136 indicates the beginning of a system bus cycle, and is a negative active signal which, in the full speed mode (FIG. 4) is active for one full speed clock period, and in the half speed mode (FIG. 5) is active for one half speed clock cycle (two full speed clock cycles). Hence, during a full speed cycle, the system devices have only half the time to recognize and communicate with the other system devices as they would have during a half speed cycle.

The fourth line of FIGS. 4 and 5 represent a burst ready signal 138. The burst ready signal 138 is a negative active signal. During the active periods of the burst ready signal 138, burst transfers of data may occur over the system bus 76. As explained above, system bus controller interface 122 (see FIG. 2) supports a high performance 32-bit (4 byte) i486 burst protocol over the system bus 76 at the system bus operational speed. One example of a burst data transfer occurs when data is written from the FIFO buffer 124 over the system bus 76 to system memories 24 and 26. The data stored in buffers 125C and 125D in FIFO 124 is written to system memory via an i486 burst transfer at the system bus operational speed.

As shown in FIG. 4, the burst ready signal 138 in the full speed mode is inactive during the address strobe signal active period. The burst ready signal remains inactive for two full speed clocks cycles after the address strobe signal 136 goes inactive, and then goes active for two full speed clock signals. During these two active full speed cycles for the burst ready signal 138 (periods 4 and 5 of the full speed clock signal of FIG. 4), two 32-bit transfers of data may be written to system memories 24 and 26. The same burst data transfer may again occur during the next active period of the burst ready signal 138 (periods 8 and 9 of the full speed clock signal of FIG. 4).

As shown in FIG. 5, the burst ready signal 138 in the half speed mode is inactive during the address strobe signal active period. The burst ready signal 138 remains inactive for two half speed clock cycles (four full speed clock cycles) after the address strobe signal 136 goes inactive. The burst ready signal 138 then goes active for two half speed clock signals. During these two active half speed cycles for the burst ready signal 138 (periods 7-10 of the full speed clock signal of FIG. 5), two 32-bit transfers of data may be written to system memories 24 and 26. The same burst data transfer may again occur during the next active period of the burst ready signal 138. Accordingly, the transfer in FIG. 4 takes a full speed clock cycles to complete, whereas the same transfer takes 18 full speed clock cycles (9 half speed clock cycles) in FIG. 5. In this manner a full speed busmaster's bandwidth is optimized while allowing half speed controllers to synchronously coexist on the same bus.

Accordingly, the preferred embodiment of a bus control logic system for computers having dual bus architecture has been described. With the foregoing description in mind, however, it is understood this description is made only by way of example, that the invention is not limited to the particular embodiments described herein, and that various rearrangements, modifications, and substitutions may be implemented without departing from the true spirit of the invention as hereinafter claims.

We claim:

1. A computer system containing a clock recurring at a predetermined frequency, said computer system comprising:

a processor subsystem;

a system memory used by said processor subsystem and other components of said computer system;

a memory controller controlling access to said system memory;

a local bus connecting said processor subsystem to said system memory via said memory controller;

an input-output (I/O) interface for connecting said computer system to at least one input-output (I/O) device via an I/O bus;

a system bus connecting said I/O interface to said memory controller, said system bus being isolated from said I/O bus by said I/O interface and being isolated from said local bus by said memory controller; said memory controller using said system bus to transfer data between said system memory and said other components of said computer system;

a direct memory access controller connected to said system bus and requiring communication with said memory controller via said system bus to conduct data transfers between said system memory and said I/O interface; said system bus including a speed control line used by each of said memory controller, said I/O interface, and said direct memory access controller for variably controlling the speed of data transfers conducted over said system bus;

said speed control line being driven to a first state by said memory controller and said I/O interface, when said memory controller and said I/O interface respectively control said system bus, and to a second state by said direct memory access controller when said direct memory access controller controls said system bus;

said speed control line, when driven to said first state by either said memory controller or said I/O interface while data is being transferred over said system bus between said system memory and said I/O interface, allowing said data being transferred to be transferred at a first predetermined data transfer speed synchronous with said predetermined frequency;

said speed control line, when driven to said second state by said direct memory access controller, causing data to be transferred over said system bus at a second predetermined data transfer speed synchronous with said predetermined frequency but slower than said first data transfer speed.

2. A computer system in accordance with claim 1 wherein:

said first data transfer speed is an integral multiple of said second data transfer speed; and by virtue of the synchronization between said first and second data transfer speeds and said predetermined frequency, said system bus remains instantly synchronized for data transfers when control of said system bus passes between said memory controller, said I/O interface and said direct memory access controller, thereby eliminating need for a resynchronization delay when said control of said system bus passes.

3. A computer system in accordance with claim 1 wherein:

said system bus contains data, address and control lines;

said address lines are used by: said memory controller to address said I/O interface and said direct memory access controller; said I/O interface to address said memory controller and said direct memory access controller; and said direct memory access controller to address said memory controller and said I/O interface;

an address assigned to said direct memory access controller on said system bus lies in a range uniquely distinct from addresses assigned to said memory controller and said I/O interface on said system bus; and said memory controller, when in control of said system bus and addressing said direct memory access controller, is required to conduct data transfers over said system bus only at said second data transfer speed.

4. A computer system in accordance with claim 3 wherein:

said I/O bus is provided with data, address and control lines;

said I/O interface is a bus interface unit interfacing between said I/O bus and said system bus and having data transfer, addressing and control connections to both said system bus and said I/O bus; and said direct memory access controller is provided with data transfer, addressing and control connections only to said system bus.

5. A computer system in accordance with claim 3 wherein:

said first data transfer speed is approximately two times faster than said second data transfer speed.

6. In a computer system containing a processor, an input-output (I/O) interface for connecting said computer system to input-output (I/O) devices, a system memory, a memory controller connected to the system memory, a system bus connecting the memory controller, the I/O interface, and a direct memory access controller, said direct memory access controller having a slower operating speed than said I/O interface and said memory controller; a method of varying the speed at which data is transferred over said system bus between said system memory and said I/O interface and said direct memory access controller, without requiring resynchronization of said system bus whenever control of said system bus passes between said memory controller, and said I/O interface and said direct memory access controller; said method comprising:

requiring said memory controller and said I/O interface to transfer data over said system bus at a predetermined first data transfer speed when either said memory controller or said I/O interface is in control of said system bus, and data is being transferred over said system bus between said system memory and said I/O interface;

requiring said memory controller and said I/O interface and said direct memory access controller to transfer data over said system bus at a predetermined second data transfer speed less than said first predetermined data transfer speed when said direct memory access controller is in control of said system bus and data is being transferred over said system bus between said direct memory access controller and either said memory controller or said I/O interface;

restricting said first and second data transfer speeds to be synchronous to a common reference frequency; and constraining said first data transfer speed to be an integral multiple of said second data transfer speed.

7. The method of claim 6 wherein: said I/O interface includes an I/O bus;

said I/O interface is a bus interface unit interfacing directly between said system bus and said I/O bus, and said bus interface unit has an internal data handling rate commensurate with said first data transfer speed; and said direct memory access controller is provided with an internal data handling rate commensurate only with said second data transfer speed.

* * * * *